(12) United States Patent
Kim

(10) Patent No.: US 10,750,907 B2
(45) Date of Patent: *Aug. 25, 2020

(54) FOOD PROCESSOR

(71) Applicant: NUC Electronics Co., Ltd., Daegu (KR)

(72) Inventor: Jong Boo Kim, Daegu (KR)

(73) Assignee: NUC Electronics Co., Ltd., Daegu (KR)

( * ) Notice: Subject to any disclaimer, the term of this patent is extended or adjusted under 35 U.S.C. 154(b) by 133 days.

This patent is subject to a terminal disclaimer.

(21) Appl. No.: 15/806,083

(22) Filed: Nov. 7, 2017

(65) Prior Publication Data

US 2019/0133378 A1     May 9, 2019

(51) Int. Cl.
| | |
|---|---|
| *A47J 43/07* | (2006.01) |
| *B02C 18/16* | (2006.01) |
| *B02C 18/12* | (2006.01) |
| *A47J 43/046* | (2006.01) |

(52) U.S. Cl.
CPC ......... *A47J 43/0716* (2013.01); *A47J 43/046* (2013.01); *A47J 43/07* (2013.01); *B02C 18/12* (2013.01); *B02C 18/16* (2013.01)

(58) Field of Classification Search
CPC .... A47J 43/07; A47J 43/0716; A47J 43/0727; A47J 43/046; B02C 18/12; B02C 18/16
USPC ................................................... 241/199, 92
See application file for complete search history.

(56) References Cited

U.S. PATENT DOCUMENTS

| | | | | | |
|---|---|---|---|---|---|
| 4,111,372 | A | * | 9/1978 | Hicks .................... | A47J 43/046 241/282.1 |
| 4,883,144 | A | * | 11/1989 | Haushalter ............. | A47J 43/07 181/198 |
| 4,892,413 | A | * | 1/1990 | Vats .................... | A47J 43/0716 181/200 |
| 5,272,285 | A | * | 12/1993 | Miller ................. | F04B 39/0033 181/202 |

(Continued)

FOREIGN PATENT DOCUMENTS

| | | |
|---|---|---|
| CN | 204158261 U | 2/2015 |
| KR | 10-1391972 B1 | 5/2014 |

(Continued)

OTHER PUBLICATIONS

NPL Video Reference, "Kilner 2 Litre Square Clip Top Glass Storage Jar close look", YouTube.com, Jan. 15, 2015. URL: www.youtube.com/watch?v=1R5BbgzcQq0 (Year: 2015).*

(Continued)

*Primary Examiner* — Faye Francis
(74) *Attorney, Agent, or Firm* — Seed IP Law Group LLP

(57) ABSTRACT

A food processor may include: a base; a container including an accommodation tub installed on an upper surface of the base and accommodating a processing target, a handle support part laterally protruding from a side surface of the accommodation tub, and a handle extending upwards or downwards from the handle support part; a lower enclosure installed on the upper surface of the base to surround a lower portion of the accommodation tub; and an upper enclosure positioned in a coupled state and a released state with respect to the lower enclosure and cooperatively supporting the handle support part together with the lower enclosure to suppress shaking of the container.

20 Claims, 11 Drawing Sheets

(56) References Cited

U.S. PATENT DOCUMENTS

| | | | | |
|---|---|---|---|---|
| 5,533,797 | A * | 7/1996 | Gelber | A47J 43/07 206/320 |
| 5,957,577 | A * | 9/1999 | Dickson | A47J 43/07 366/197 |
| D426,423 | S * | 6/2000 | Lee | D7/384 |
| D427,016 | S * | 6/2000 | Kindig | D7/412 |
| D428,564 | S * | 7/2000 | Kao | D7/374 |
| D432,864 | S * | 10/2000 | Kindig | D7/412 |
| D466,761 | S * | 12/2002 | Baerenrodt | D7/378 |
| D471,059 | S * | 3/2003 | Chuang | D7/374 |
| 6,571,908 | B2 * | 6/2003 | Bohannon | A47J 43/0716 160/201 |
| 6,776,086 | B1 * | 8/2004 | Chang Chien | A47J 43/0766 241/37.5 |
| D526,845 | S * | 8/2006 | Katz | D7/412 |
| D528,364 | S * | 9/2006 | Kolar | D7/413 |
| D556,506 | S * | 12/2007 | Spagnolo | D7/378 |
| 7,520,663 | B1 * | 4/2009 | Kolar | A47J 43/07 312/326 |
| 8,087,603 | B2 * | 1/2012 | Kolar | A47J 43/0716 241/285.3 |
| 8,287,180 | B2 * | 10/2012 | Kolar | A47J 43/0716 366/347 |
| 8,752,481 | B2 * | 6/2014 | Williams | A47J 43/085 366/197 |
| RE45,655 | E * | 8/2015 | Kolar | A47J 43/0716 |
| 9,999,319 | B2 * | 6/2018 | Kim | A47J 43/046 |
| D838,538 | S * | 1/2019 | Carlson | D7/378 |
| 10,321,786 | B2 * | 6/2019 | Kim | A47J 43/046 |
| 10,334,986 | B2 * | 7/2019 | Gross | A47J 43/0716 |
| 10,376,102 | B2 * | 8/2019 | Bock | A47J 43/046 |
| 10,383,481 | B2 * | 8/2019 | Kim | A47J 43/0716 |
| 2003/0034200 | A1 * | 2/2003 | Bohannon | A47J 43/0716 181/202 |
| 2005/0152215 | A1 * | 7/2005 | Stuart | A47J 43/0716 366/205 |
| 2006/0007778 | A1 * | 1/2006 | Tai | H02K 9/06 366/205 |
| 2008/0047439 | A1 * | 2/2008 | Tracy | A47J 27/04 99/339 |
| 2010/0014380 | A1 * | 1/2010 | Kolar | A47J 43/0716 366/347 |
| 2013/0291645 | A1 * | 11/2013 | Gammon | G01L 7/16 73/716 |
| 2014/0137750 | A1 * | 5/2014 | Arai | A47J 43/046 99/334 |
| 2014/0217211 | A1 * | 8/2014 | Sanford | A47J 43/0761 241/37.5 |
| 2015/0044344 | A1 * | 2/2015 | Choi | A47J 43/046 426/519 |
| 2016/0035335 | A1 * | 2/2016 | Kolar | G10K 11/16 366/314 |
| 2017/0086622 | A1 * | 3/2017 | Chung | A47J 43/046 |
| 2017/0273508 | A1 | 9/2017 | Kim | |

FOREIGN PATENT DOCUMENTS

| | | | |
|---|---|---|---|
| KR | 10-1674164 B1 | 11/2016 | |
| KR | 20-2016-0004201 U | 12/2016 | |
| KR | 10-2017-0006049 A | 1/2017 | |
| KR | 20170070870 | * 6/2017 | |
| KR | 10-2017-0096383 A | 8/2017 | |
| WO | 2010/019242 A1 | 2/2010 | |
| WO | 2016/072203 A1 | 5/2016 | |
| WO | WO-2017161854 A1 | * 9/2017 | A47J 43/04 |

OTHER PUBLICATIONS

KR-20170070870: Abstract Machine Translation, by Espacenet.com (Year: 2017).*
International Search Report, dated Jan. 25, 2019, for International Application No. PCT/KR2018/012374, 3 pages.
Extended European Search Report, dated Apr. 19, 2018, for European Application No. 17200685.0-1006, 7 pages.

* cited by examiner

FOOD PROCESSOR

BACKGROUND

Technical Field

The present disclosure relates to a food processor and, more particularly, to a food processor for performing processing such as grinding (or crushing), processing, cooking, and the like, on food.

Description of the Related Art

Various food processors performing grinding, mixing, juice extraction on food are present.

A food processor generally performs processing on food using a processing member (blade, screw, etc.), after the food to be processed is introduced to a container.

The food processor includes a motor for driving the processing member, and, in general, the motor involves noise and vibrations during an operation. Also, the processing member driven by the motor collides with food and causes a collision between food and an inner wall of the container to generate noise and vibrations.

Among food processors is a blender having an enclosure for blocking (or shielding) noise during an operation thereof.

However, such a blender includes an enclosure which entirely covers the container, requires a base greater than the container, and occupies space even larger than an amount of actually processed food.

Also, during an operation of the food processor, vibrations, as well as noise, are generated, and the food processor generally has a structure in which the container is detachably coupled to the base, and thus, a height of the food processor is greater than a width thereof. In this structure, vibrations transmitted to the container increase a conduction risk of the food processor during an operation of the food processor, and in addition, vibrations transmitted to the container degrade a binding force between the container and the base.

BRIEF SUMMARY

An aspect of the present disclosure provides a food processor capable of suppressing shaking of a container generated during an operation and effectively shielding noise caused due to an operation of a processing member.

Technical tasks obtainable from embodiments of the present invention are not limited to the above-mentioned technical task and any other unmentioned technical tasks can be clearly understood from the following description by those having ordinary skill in the art.

In an aspect, a food processor may include: a base; a container including an accommodation tub installed on an upper surface of the base and accommodating a processing target, a handle support part laterally protruding from a side surface of the accommodation tub, and a handle extending from the handle support part; a lower enclosure installed on the upper surface of the base to surround a lower portion of the accommodation tub and supporting a lower surface of the handle support part by a portion of an upper end thereof; and an upper enclosure positioned in a coupled state and a released state with respect to the lower enclosure and engaged with the lower enclosure such that a portion of a lower end thereof supports an upper surface of the handle support part in the coupled state, wherein at least one of the upper enclosure and the lower enclosure supports a side surface of the handle support part to suppress shaking of the container.

A lower end of the upper enclosure may include an upper support surface and a first side support surface and a second side support surface respectively extending downwards from both ends of the upper support surface, and in the coupled state, the upper support surface may support an upper surface of the handle support part, and the first side support surface and the second side support surface may support at least a portion of a side surface of the handle support part.

A space between the first side support surface and the second side support surface may be formed such that, when the upper enclosure is moved from the released state to the coupled state, the handle support part cannot enter a space between the first side support surface and the second side support surface merely by a self-load of the upper enclosure, or although the handle support part enters the space between the first side support surface and the second side support surface, the handle support part cannot come into contact with the upper support surface, and an upper surface of the handle support part can come into contact with the upper support surface only by an additional external force.

The upper support surface, the first side support surface, and the second side support surface may be configured as sealing members having an elastic force.

An upper end of the lower enclosure may include a lower support surface and a first side support surface and a second side support surface respectively extending upwards from both ends of the lower support surface, and in the coupled state and the released state, the lower support surface may support a lower surface of the handle support part and the first side support surface and the second side support surface may support at least a portion of a side surface of the handle support part.

A space between the first side support surface and the second side support surface may be formed such that, when the container is installed on the upper surface of the base, the handle support part cannot enter a space between the first side support surface and the second side support surface merely by a self-load of the container, or although the handle support part enters the space between the first side support surface and the second side support surface, the handle support part cannot come into contact with the lower support surface, and a lower surface of the handle support part can come into contact with the lower support surface only by an additional external force.

The lower support surface, the first side support surface, and the second side support surface may be configured as sealing members having an elastic force.

The container may further include a processing member rotatably installed within the accommodation tub and processing the processing target, the base may include a power source providing a rotational power to the processing member, and in the coupled state, the upper enclosure and the lower enclosure may support an upper surface, a lower surface, and a side surface of the handle support part to suppress shaking of the container caused due to rotation of the processing member.

The food processor may further include: a vacuum exhaust line fluidably connected to the inside of the accommodation tub accommodating the processing target in the coupled state; and a vacuum pump connected to the vacuum exhaust line and exhausting internal air of the accommodation tub to the outside through the vacuum exhaust line, wherein, in the coupled state, the upper enclosure and the lower enclosure may support the upper surface, the lower surface, and the side surface of the handle support part to suppress shaking of the container caused during an operation of the vacuum pump.

The upper enclosure may be engaged with the lower enclosure, while surrounding an upper portion of the accommodation tub, in the coupled state, to form an air-tight space surrounding the accommodation tub and at least a portion of the handle support part.

In the coupled state, a lower end of the upper enclosure and an upper end of the lower enclosure may be engaged with each other, excluding a portion in contact with the handle support part.

The lower end of the upper enclosure and the upper end of the lower enclosure may be configured as sealing members having an elastic force.

The upper enclosure may be installed to be rotatable within a range of a predetermined angle with respect to the lower enclosure so as to be positioned in the released state and the coupled state, and a rotation center of the upper enclosure may be positioned to be higher than a lower surface of the handle support part.

The lower end of the upper enclosure may include a first lower end part positioned to be adjacent to the rotation center, a second lower end part supporting the handle support part, and a third lower end part connecting the first lower end part and the second lower end part, both ends of the second lower end part may be positioned to be lower than the first lower end part, and the third lower end part may connect the first lower end part and the second lower end part, while forming an oblique line.

The second lower end part may include an upper support surface supporting an upper end of the handle support part and a first side support surface and a second side support surface respectively extending downwards from both ends of the upper support surface and supporting at least a portion of a side surface of the handle support part.

The upper end of the lower enclosure may include a first upper end part positioned to be adjacent to the rotation center, a second upper end part supporting the handle support part, and a third upper end part connecting the first upper end part and the second upper end part, both ends of the second upper end part may be positioned to be lower than the first upper end part, and the third upper end part may connect the first upper end part and the second upper end part, while forming an oblique line.

The food processor may further include: a support post extending upwards from the base and rotatably supporting the upper enclosure.

The food processor may further include: a vacuum pump provided within the base; and a vacuum exhaust line connected to the vacuum pump at one end and connected to the upper enclosure at the other end through the support post and fluidably connected to the inside of the accommodation tub in the coupled state.

The upper enclosure may be completely separated from the lower enclosure in the released state.

In another aspect, a food processor may include: a base; a container including an accommodation tub installed on an upper surface of the base and accommodating a processing target, a handle support part laterally protruding from a side surface of the accommodation tub, and a handle extending upwards or downwards from the handle support part; a lower enclosure installed on the upper surface of the base to surround a lower portion of the accommodation tub; and an upper enclosure positioned in a coupled state and a released state with respect to the lower enclosure and cooperatively supporting the handle support part together with the lower enclosure to suppress shaking of the container.

Details of embodiments of the present disclosure are included in detailed descriptions and drawings.

The embodiments of the present disclosure have the following advantages and effects.

Shaking of the container that occurs during an operation may be suppressed and noise due to an operation of the processing member may be effectively shielded.

The advantages and effects of the present disclosure are not limited to those described above and any other various effects may also be included in this disclosure.

BRIEF DESCRIPTION OF THE SEVERAL VIEWS OF THE DRAWINGS

The above and other objects and features of embodiments of the present invention will become apparent from the following description of preferred embodiments given in conjunction with the accompanying drawings, in which.

DETAILED DESCRIPTION

Figure 1:
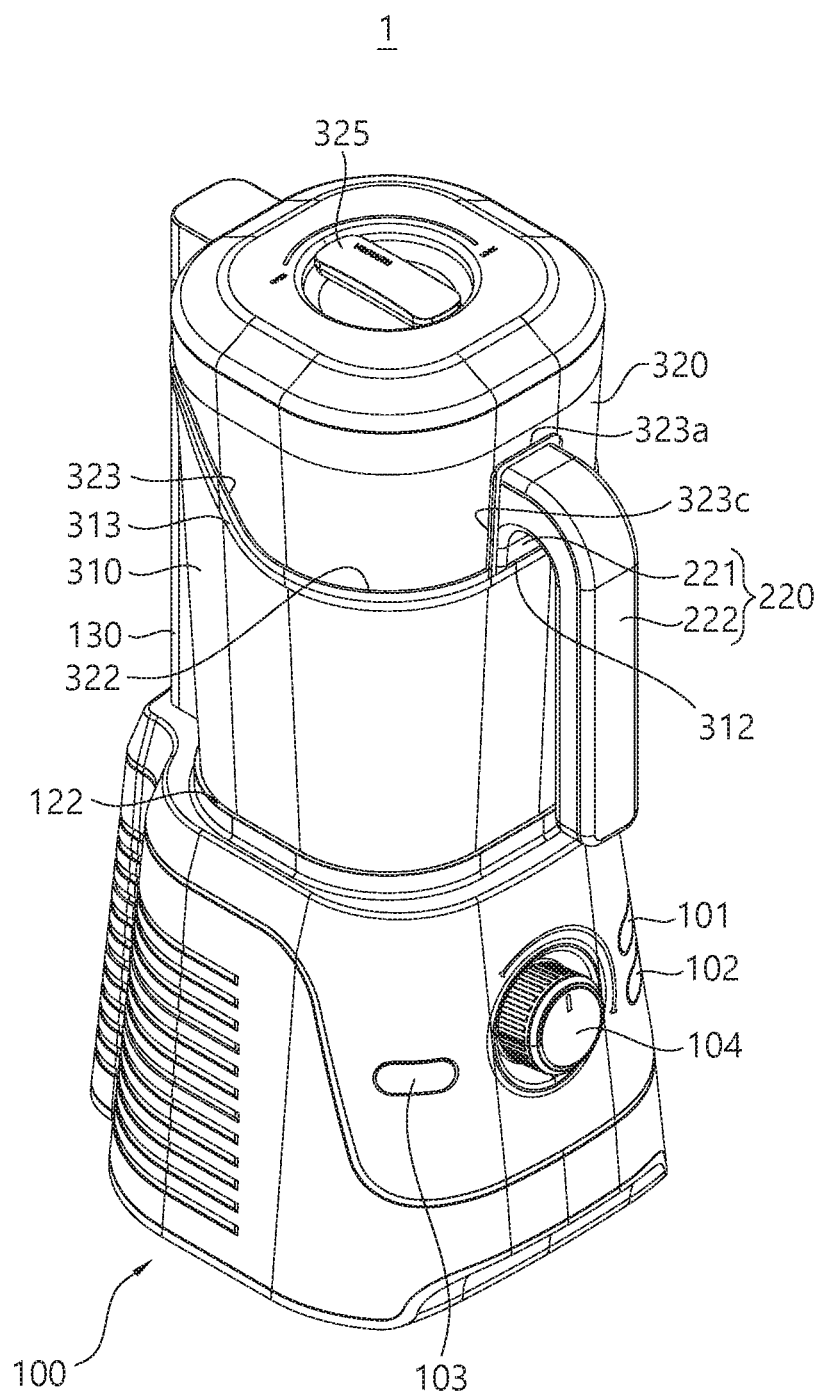
FIG. 1 is a perspective view illustrating a food processor according to an embodiment of the present disclosure.

Advantages and features of the present disclosure and implementation methods thereof will be clarified through following exemplary embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present invention is only defined by scopes of claims. Throughout the specification, like numbers refer to like elements.

Exemplary embodiments of this specification invention will be described with reference to cross-sectional and and/or top plan views of the embodiments of the present invention. Therefore, a form of the drawings by production technology and/or an allowable error may be changed. In the drawings of the present disclosure, components may be exaggerated or reduced to easily understand for the convenience of description. Throughout the specification, like reference numerals denote the substantially same elements.

Hereinafter, a food processor according to an embodiment of the present disclosure will be described with reference to the accompanying drawings.

Figure 2:
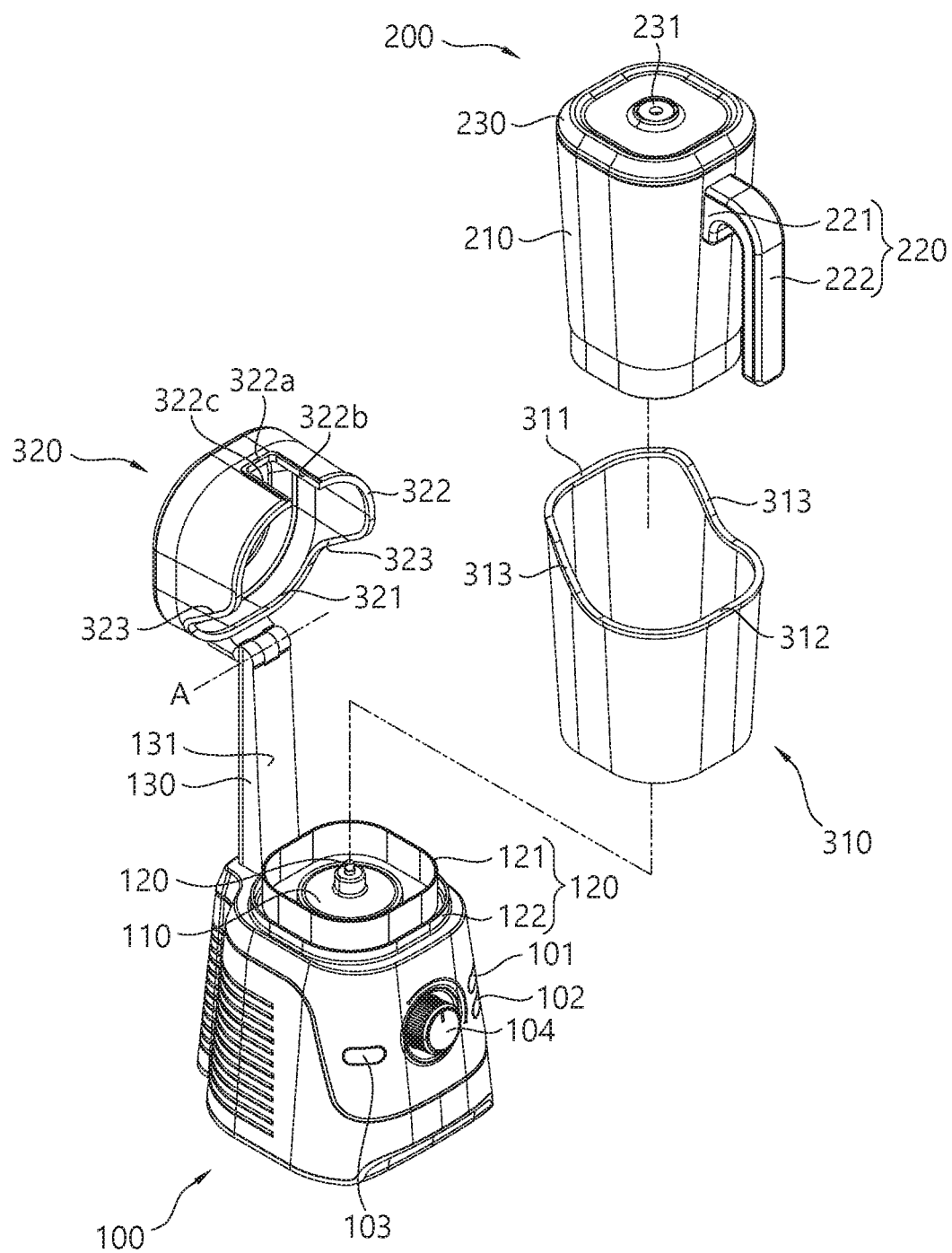
FIG. 2 is an exploded perspective view of a food processor according to an embodiment of the present disclosure.
Figure 3:
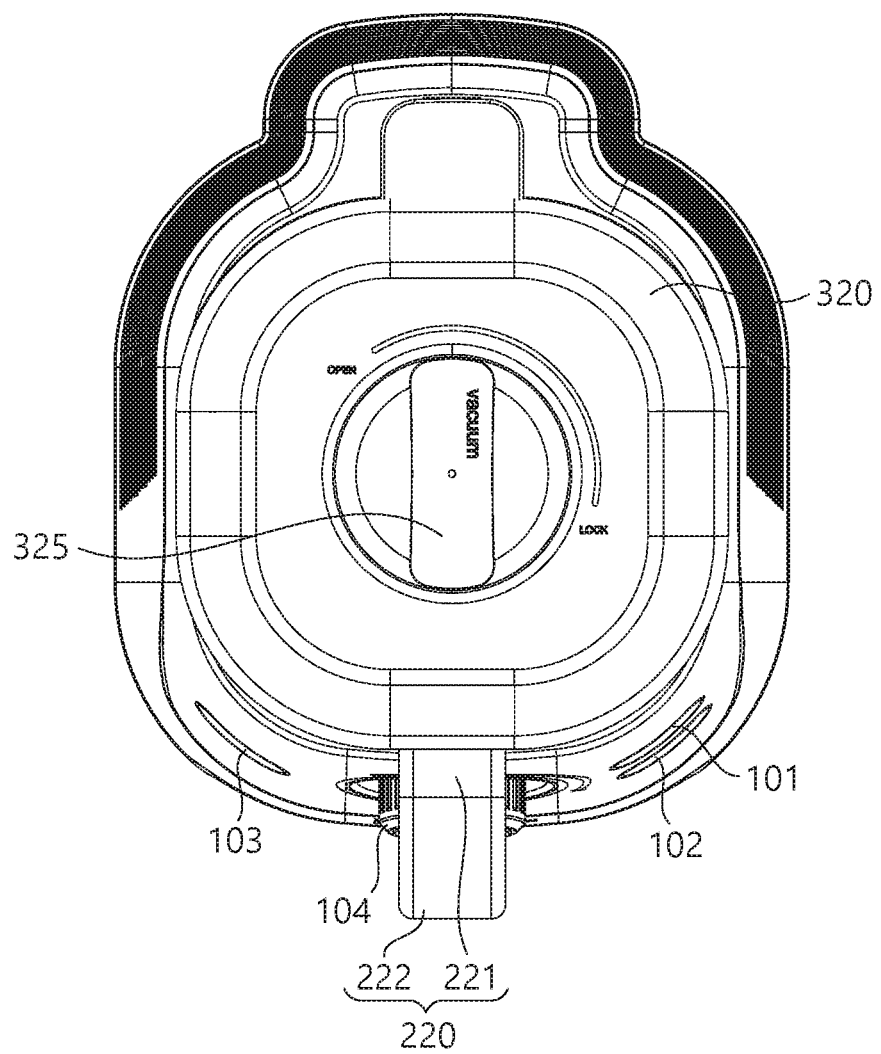
FIG. 3 is a plan view of a food processor according to an embodiment of the present disclosure.

FIG. 1 is a perspective view illustrating a food processor according to an embodiment of the present disclosure, FIG. 2 is an exploded perspective view of a food processor according to an embodiment of the present disclosure, and FIG. 3 is a plan view of a food processor according to an embodiment of the present disclosure.

As illustrated in FIGS. 1 and 2, a food processor 1 according to an embodiment of the present disclosure includes a base 100, a container 200, and enclosures 310 and 320. The enclosures 310 and 320 include an upper enclosure 320 and a lower enclosure 310.

The base 100 may include a motor 105 (see FIG. 4), a vacuum pump 106 (see FIG. 4), and a circuit board (not shown) for controlling the motor 105 and the vacuum pump 106. According to an embodiment, the motor 105 and the vacuum pump 106 may be optionally included. For the purposes of description, hereinafter, the food processor 1 including both the motor 105 and the vacuum pump 106 will be described as a reference.

Operating units 101, 102, 103, and 104 for operating the food processor 1 may be provided on a front surface and/or side surface, etc. In this embodiment, a plurality of buttons 101, 102, and 103 for selecting an operation mode and a dial 104 for controlling an output of the motor 105 or the vacuum pump 106 are illustrated as the operating units 101, 102, 103, and 104. However, according to embodiments, an operating unit such as a capacitive or resistive touch display, an electrode switch, and the like, may also be used.

An air inlet (no reference number) and an air outlet (no reference number) for air flowing to cool the motor 105 or the vacuum pump 106 may be provided on a rear surface, side surface and/or a bottom surface of the base 100. Here, the base 100 may include a fan (not shown) forcibly causing air to flow therein.

As illustrated in FIG. 2, a container coupling end 110, lower enclosure coupling ends 121 and 122, and a support port 130 are provided on an upper surface of the base. 100.

The container coupling end 110 may form a region on which the container 120 described hereinafter is mounted and fix the container 200 to the base 100. In case where the base 100 includes the motor 105, an output shaft 120 of the motor 105 may be rotatably exposed with respect to the base 100 at a central portion of the container coupling end 110.

The lower enclosure coupling ends 121 and 122 are provided near the container coupling end 110. The lower enclosure coupling ends 121 and 122 may form a region on which the lower enclosure 310 is mounted and fix the lower enclosure 310 to the base 100.

As illustrated in FIG. 2, the lower enclosure coupling ends 121 and 122 may include an inner support part 121 and an outer support part 122.

The outer support part 122 is provided near the inner support part 121 such that a predetermined space between the outer support part 122 and the inner support part 121 is maintained.

The inner support part 121 supports an inner side wall of a lower end of the lower enclosure 310, and the outer support part 122 may fix the lower enclosure 310 in a manner of supporting an outer side wall of a lower end of the lower enclosure 310.

In FIG. 2, an example in which the inner support part 121 and the outer support part 122 have an annular shape forming a concentric circle is illustrated, but the inner support part 121 and the outer support part 122 may be variously modified according to a shape of the lower enclosure 310, or the like.

Also, in FIG. 2, an example in which the inner support part 121 and the outer support part 122, as an example of the lower enclosure coupling ends 121 and 122, protrude from an upper surface of the base 100 is illustrated, but according to embodiments, the lower enclosure coupling ends 121 and 122 may depressed from an upper surface of the base 100 to form a space to accommodate a lower end of the lower enclosure 310.

As illustrated in FIG. 2, the support post 130 extends upwards from an upper surface of the base 100.

On the upper surface of the base 100, the support post 130 may be provided in a position adjacent to a rear surface of the base 100, and the upper enclosure 320 is rotatably installed at an upper end of the support post 130. The upper enclosure 320 may be installed such that a rotational axis A is parallel to a horizontal plane.

One surface (surface adjacent to the container 200) of the support post 130 may correspond to a shape of an outer surface of the container 200. For example, in case where the container 200 has a shape in which a diameter thereof is increased upwards, one surface of the support post 130 may have a sloped surface increased in an outward direction toward an upper side.

Meanwhile, the container 200 includes an accommodation tub 210, a handle part 220 and a cover 230.

The receiving tub 210 forms an accommodation space accommodating a target to be processed (or a processing target) such as food, or the like. An opening allowing a processing target to be introduced therethrough is provided at an upper end of the accommodation tub 210, and the cover 230 is coupled to the accommodation tub 210 to open and close the opening provided at the upper end of the accommodation tub 210.

In case where the vacuum pump 106 is provided in the base 100, an intake port 231 may be provided on the cover 230. The intake port 231 is fluidably connected to an intake nozzle 327 (see FIG. 6) described hereinafter. Details thereof will be described hereinafter.

A processing member 240 (see FIG. 4) for processing a processing target may be provided in the accommodation space of the accommodation tub 210. The processing member 240 may be a blade for grinding a processing target such as food, or the like. The processing member 240 may be rotatably installed within the accommodation tub 210 and may be directly coupled to the output shaft 120 exposed from the container coupling end 110 or coupled by the medium of at least one power transmission member. The motor 105 may be a power source providing a rotational power to the processing member 240. As the output shaft 120 is rotated according to an operation of the motor 105, the processing member 240 is rotated to process the processing target within the accommodation tub 210. A user may adjust revolution per minute (RPM) of the processing member 240 by controlling an output of the motor 105 using the dial 104.

A structure corresponding to a shape of the container coupling end 110 may be engraved at a lower end of the accommodation tub 210, to allow the accommodation tub 210 to accommodate the protruding container coupling end 110, and as the container coupling end 110 and the accommodation tub 210 are coupled, the container 200 is fixed to the base 100.

The handle part 220 is supported by an outer surface of the accommodation tub 210.

The handle part 220 includes a handle support part 221 and a handle 222.

The handle support part 221 laterally protrudes from an outer surface of the accommodation tub 210, and the handle 222 extends downwards from the handle support part 221. In this embodiment, an example in which the handle 222 extends downwards from the handle support part 221 is illustrated, but, according to embodiments, the handle 222 may extend upwards or laterally from the handle support part 221.

The handle part 220 may be integrally formed with the accommodation tub 210.

Meanwhile, the enclosures 310 and 320 include an upper enclosure 320 and a lower enclosure 310.

The lower enclosure 310 surrounds a lower portion of the accommodation tub 210 of the container 200. An upper end of the lower enclosure 310 is open to allow the container 200 to pass therethrough, and a lower end thereof is open to allow the container coupling end 110 and the container 200 to be coupled.

An inner side wall of the lower enclosure 310 may have a shape similar to that of an outer side wall of the accommodation tub 210, and a space between the inner side wall of the lower enclosure 310 and the outer side wall of the accommodation tub 210 may be maintained within a range from a few millimeters to 2 centimeters.

As described above, the lower end of the lower enclosure 310 is coupled to the lower enclosure coupling ends 121 and 122 and fixed to the base 100.

The lower enclosure 310 may detachably installed at the lower enclosure coupling ends 121 and 122 without using a separate tool. This is to facilitate cleaning of the lower enclosure 310 and an upper surface of the base 100.

As illustrated in FIG. 2, an upper end of the lower enclosure 310 includes a first upper end part 311, a second upper end part 312, and a third upper end part 313.

The first upper end part 311, the second upper end part 312, and the third upper end part 313 form a circumference of the opening formed at the upper end of the lower enclosure 310. The third upper end part 313 connects both ends of the first upper end part 311 and the second upper end part 312, and the first upper end part 311, the second upper end part 312, and the third upper end part 313 form a single closed loop.

The second upper end part 312 is positioned to be lower than the first upper end part 311, the third upper end part 313 connects both ends of the first upper end part 311 and the second upper end part 312, while forming an oblique line.

Figure 7:
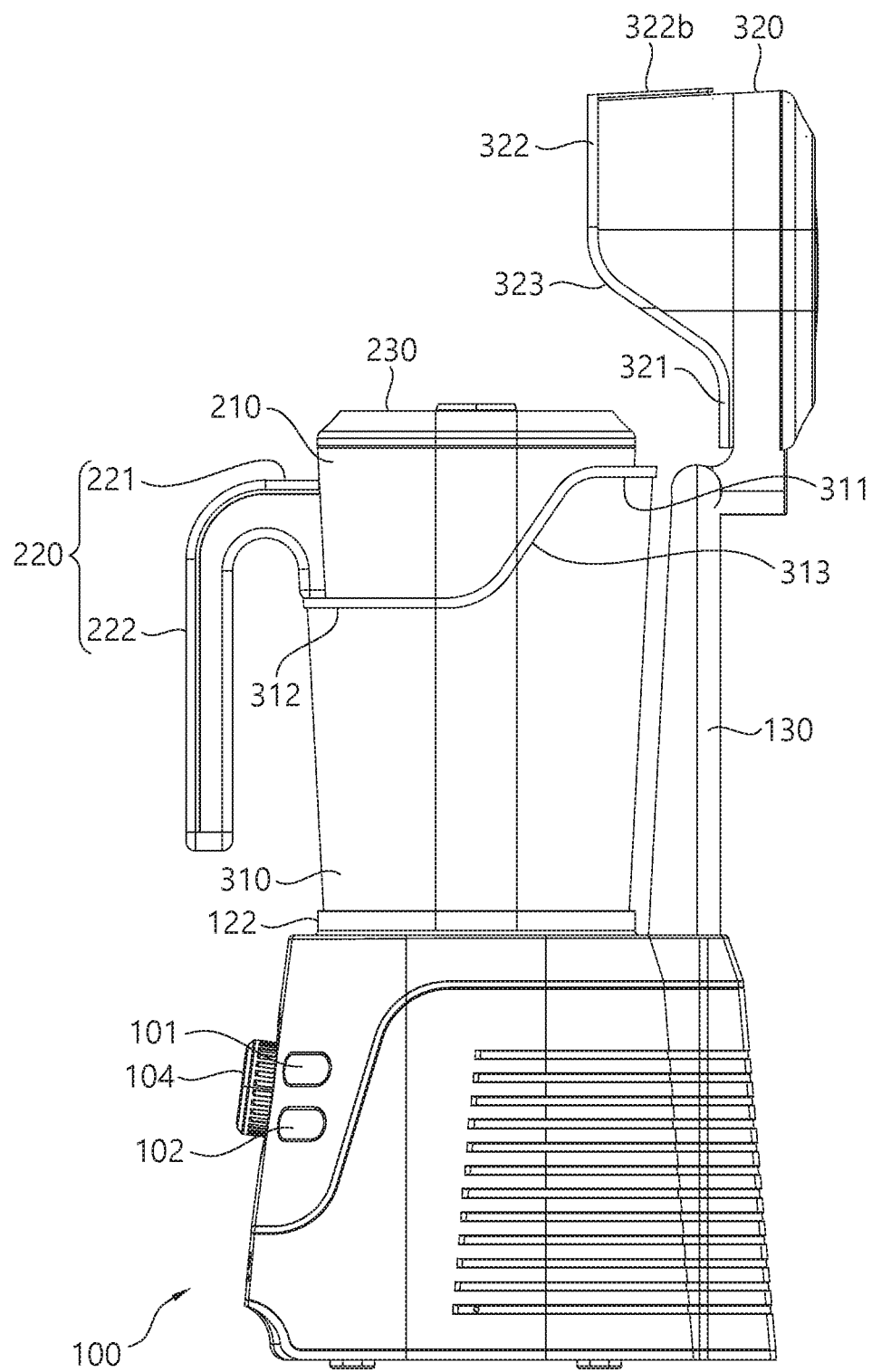
FIG. 7 is a side view illustrating a state in which an upper enclosure is positioned in a released state.

In a state in which the container 200 is coupled to the base 100, the first upper end part 311 may be positioned at a height close to an upper end of the accommodation tub 210 or a height close to the rotational axis A of the upper enclosure 320 rotatably installed at the upper end of the support post 130 (See FIG. 7).

Figure 6:
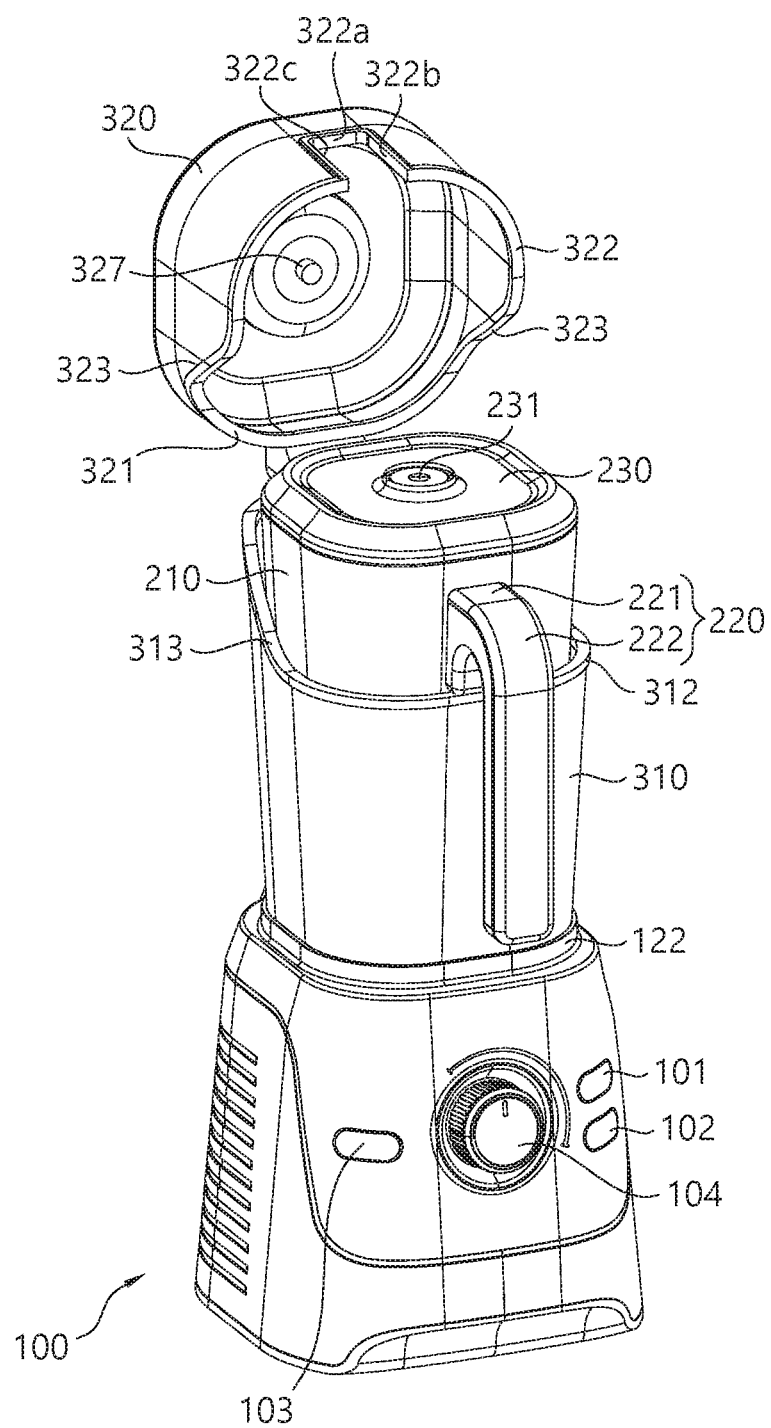
FIG. 6 is a perspective view illustrating a state in which an upper enclosure is positioned in a released state.

In a state in which the container is coupled to the base 100, the second upper end part 312 may be positioned at a height to be in contact with a lower end of the handle support part 221 to support the lower end of the handle support part 221 (See FIG. 6).

The first upper end part 311, the second upper end part 312, and the third upper end part 313 may be provided as sealing members having an elastic force.

As described above, the upper enclosure 320 is rotatably installed in the support post 130.

The upper enclosure 320 rotates about the rotational axis A and may be positioned in a coupled state and a released state with respect to the lower enclosure 310. As illustrated in FIG. 1, in the coupled state, the upper enclosure 320 is coupled to the lower enclosure 310, and as illustrated in FIG. 2, in the released state, the upper enclosure 320 is completely separated from the lower enclosure 310.

An upper end of the upper enclosure 320 is closed and a lower end thereof is open, and thus, in the coupled state, the upper enclosure 320 accommodates the cover 230 of the container 200 and a portion of the accommodation tub 210.

As illustrated in FIG. 2, a lower end of the upper enclosure 320 includes a first lower end part 321, a second lower end part 322, and a third lower end part 323.

The first lower end part 321, the second lower end part 322, and the third lower end part 323 form a circumference of the opening formed at the lower end of the upper enclosure 320. The third lower end part 323 connects both ends of the first lower end part 321 and the second lower end part 322, and the first lower end part 321, the second lower end part 322, and the third lower end part 323 form a single closed loop.

The second lower end part 322 is more distant from the upper end of the upper enclosure 320 than the first lower end part 321.

Thus, when the upper enclosure 320 is in the coupled state, both ends of the second lower end part 322 are positioned to be lower than the first lower end part 321, and the third lower end part 323 connects both ends of the first lower end part 21 and the second lower end part 322, while forming an oblique line.

As illustrated in FIG. 2, an upper support surface 322a, a first side support surface 322b, and a second side support surface 322c are formed in the second lower end part 322. The upper support surface 322a, the first side support surface 322b, and the second side support surface 322c form a circumference of a recess formed to be depressed toward an upper end from the second lower end part 322.

As illustrated in FIG. 1, when the container 200 is coupled to the base 100 and the upper enclosure 320 is positioned in the coupled state, an upper surface of the handle support part 221 of the container 200 is in contact with the upper support surface 322a and a side surface of the handle support part 221 is in contact with the first side support surface 322b and the second side support surface 322c. Simultaneously, the upper support surface 322a supports an upper surface of the handle support part 221, and the first side support surface 322b and the second side support surface 322c support both side surfaces of the handle support part 221.

The first lower end part 321, the second lower end part 322, and the third lower end part 323 may be formed as sealing members having an elastic force.

As illustrated in FIG. 3, a vacuum operating unit 325 is installed to be rotatable within a range of a predetermined angle on an upper surface of the upper enclosure 320. The vacuum operating unit 325 maintains/releases air-tightness between the intake nozzle 327 (see FIG. 6) and the intake port 231 as described hereinafter. Details thereof will be described hereinafter.

Figure 4:
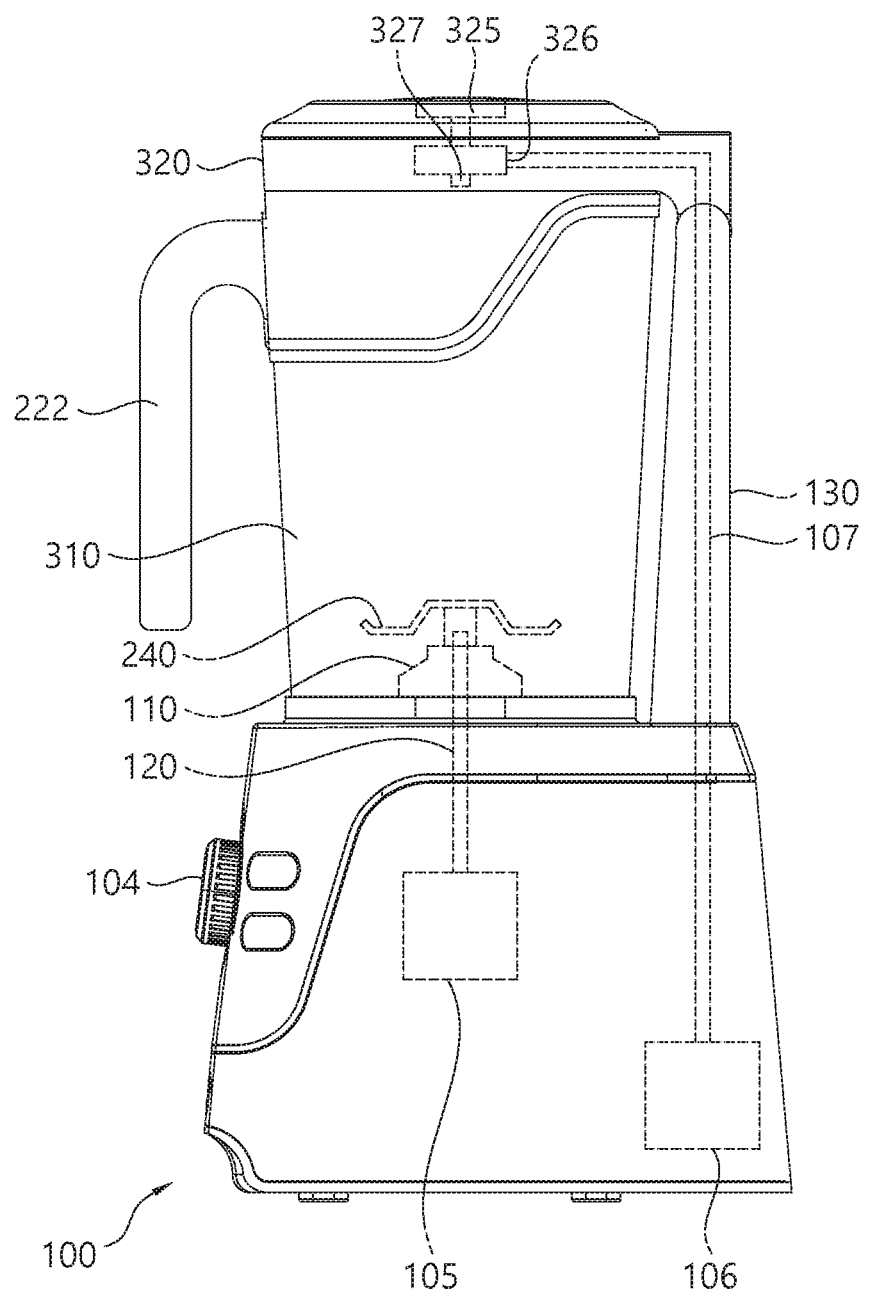
FIG. 4 is a view illustrating an internal configuration of a food processor according to an embodiment of the present disclosure.

FIG. 4 is a view illustrating an internal configuration of a food processor according to an embodiment of the present disclosure.

As illustrated in FIG. 4, the motor 105 and the vacuum pump 106 are provided within the base 100 of the food processor 1 according to an embodiment of the present disclosure.

As described above, the output shaft 120 extending from the motor 105 is exposed from an upper portion of the container coupling end 110.

An end portion of the output shaft 120 exposed from the upper portion of the container coupling end 110 is coupled to the processing member 240 rotatably installed within the accommodation tub 210. Thus, as the output shaft 120 is rotated according to an operation of the motor 105, the processing member 240 within the accommodation tub 210 is also rotated.

The vacuum pump 106 is connected to a vacuum exhaust line 107.

As illustrated in FIG. 4, the vacuum exhaust line 107 is installed to pass through the inside of the support post 130, and one end thereof is connected to the vacuum pump 106 and the other end thereof is connected to a check valve 326 provided within the upper enclosure 320.

The vacuum exhaust line 107 may be formed of a material with excellent flexibility so as to be deformed according to a movement of the upper enclosure 320 when the upper enclosure 320 is varied to a coupled state and a released state on the basis of the rotational axis A.

The check valve 326 is connected to the vacuum exhaust line 107, the vacuum operating unit 325, and the intake nozzle 327. The check valve 326 maintains/release air-tightness between the intake nozzle 327 (see FIG. 6) and the intake port 231 as described hereinafter according to an operation of the vacuum operating unit 325.

The intake nozzle 327 is exposed from a lower portion of the upper enclosure 320 (see FIG. 6), and when the upper enclosure 320 is positioned in a coupled state, the intake nozzle 327 is fluidably connected to the intake port 231.

In detail, in a state in which the vacuum operating unit 325 is operated to face "LOCK" marked on an upper surface of the upper enclosure 320 (see FIG. 3), the intake nozzle 327 and the vacuum exhaust line 107 are fluidably connected in a state of maintaining air-tightness through the check valve 326 and the intake nozzle 327 and the intake port 231 are fluidably connected in a state of maintaining air-tightness.

Here, the intake nozzle 327 may be inserted into the intake port 231 or tightly attached to the vicinity of the intake port 231 so as to be air-tightly connected to the intake port 231.

Thus, in a state in which the vacuum operating unit 326 is positioned to face "LOCK", a space connected to the inside of the accommodation tub 210, the intake port 231, the intake nozzle 327, the vacuum exhaust line 107, and the vacuum pump 106 is fluidably connected and fluidably separated from other space.

Thus, in a state in which the vacuum operating unit 325 is positioned to face "LOCK", when the vacuum pump 106 operates, a gas within the accommodation tub 210 is exhausted through the intake port 231, the intake nozzle 327, and the vacuum exhaust line 107, resulting in that the inside of the accommodation tub 210 has negative pressure lower than atmospheric pressure.

Meanwhile, in a state in which the vacuum operating unit 325 is operated to face "OPEN" marked on the upper surface of the upper enclosure 320 (see FIG. 3), the check valve 326 does not maintain air-tightness between the intake nozzle 327 and the intake port 231. For example, the check valve 326 may open a flow channel connected to the intake nozzle 327 such that pressure within the intake nozzle 327 becomes atmospheric pressure. According to an embodiment, in this state, a fluidic connection between the intake nozzle 327 and the vacuum exhaust line 107 may be released.

As the inside of the intake nozzle 327 has atmospheric pressure, air-tightness between the intake nozzle 327 and the intake port 231 is also released. Accordingly, the upper enclosure 320 may easily be switched from the coupled state to the released state.

A check valve (not shown) may be provided in the intake port 231 such that negative pressure within the accommodation tub 210 is maintained even in the state in which air-tightness between the intake nozzle 327 and the intake port 231 is released. The check valve provided in the intake port 231 may operate to open the intake port 231 when air-tightness between the intake port 231 and the intake nozzle 327 and close the intake port 231 when air-tightness between the intake port 231 and the intake nozzle 327 is released.

Figure 5:
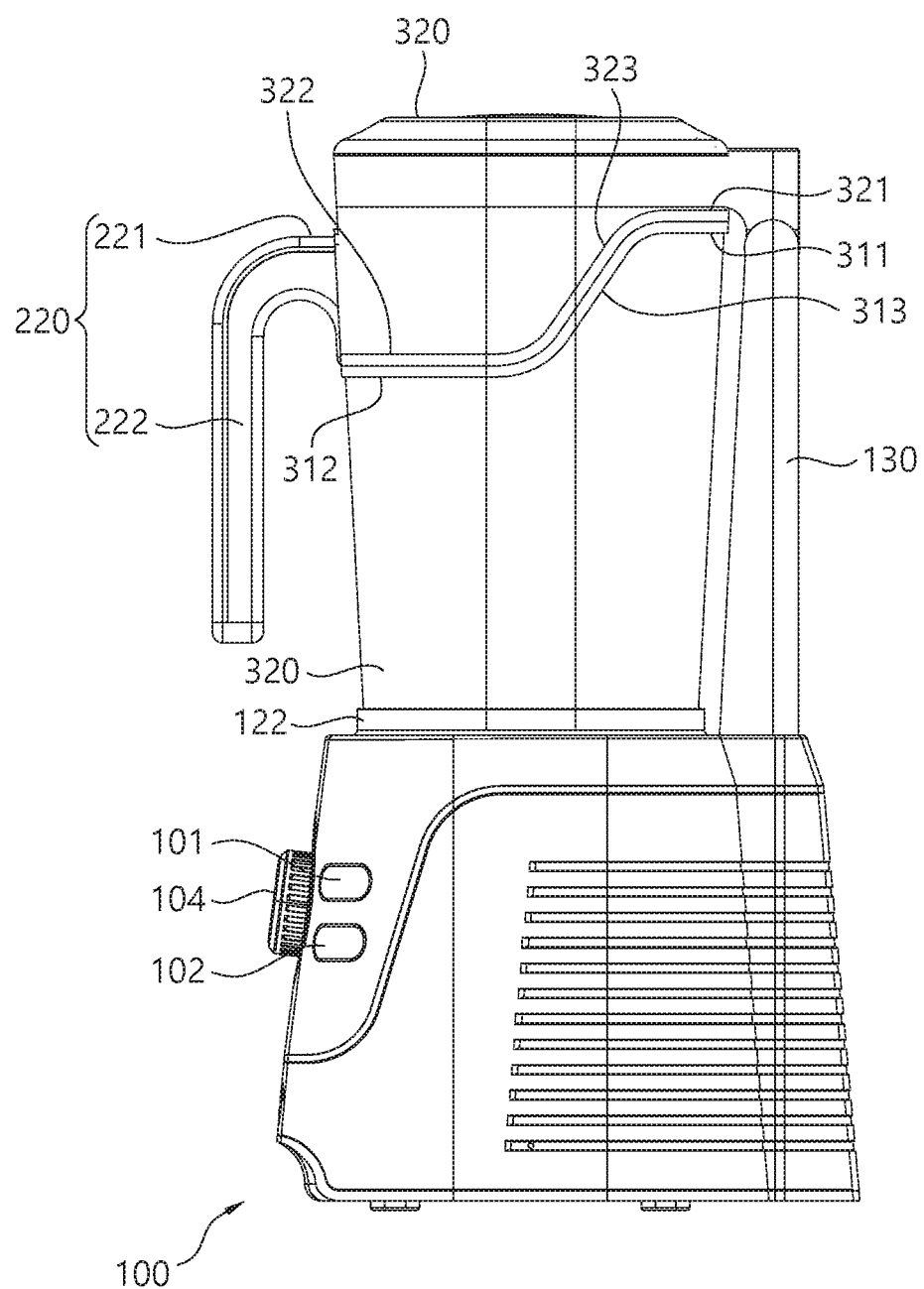
FIG. 5 is a side view illustrating a state in which an upper enclosure is positioned in a coupled state.

FIG. 5 is a side view illustrating a state in which an upper enclosure is positioned in a coupled state.

As illustrated in FIGS. 1 and 5, when the upper enclosure 320 is positioned in the coupled state, the upper enclosure 320 is engaged with the lower enclosure 310 to form an air-tight space surrounding at least portions of the cover 230, the accommodation tub 210, and the handle support part 221 of the container 200.

The first lower end part 321, the second lower end part 322, and the third lower end part 323 forming the lower end of the upper enclosure 320 are engaged with the first upper end part 311, the second upper end part 312, and the third upper end part 313 forming the upper end of the lower enclosure, excluding only a portion in contact with the handle support part 221.

The upper enclosure 320 and the lower enclosure 310 are not engaged with each other in a portion in contact with the handle support part 221, but since the second upper end part 312 of the lower enclosure 310 is in contact with a lower surface of the handle support part 221 and the upper support surface 322a, the first side support surface 322b and the second side support surface 322c of the first enclosure 320 are in contact with the upper surface and the side surface of the handle support part 221, respectively, the upper enclosure 320 and the lower enclosure 310 may surround the handle support part 221 to form an air-tight space.

Accordingly, noise generated as the processing member 240 rotates may be effectively shielded.

Also, in the food processor 1 according to an embodiment of the present disclosure, since the upper enclosure 320 and the lower enclosure 310 form the air-tight space to surround the accommodation tub 210 and the cover 230 in a state in which the handle 222 of the container 200 is exposed to the outside, an even smaller space may be occupied and noise generated as the processing member 240 rotates may be effectively shielded, compared with the related art enclosure in which even the handle 222 of the container 200 is surrounded.

Also, in the food processor 1 according to an embodiment of the present disclosure, since the handle support part 221 is supported by both the upper enclosure 320 and the lower enclosure 310 in cooperation with each other in every direction in a state in which the upper enclosure 320 and the lower enclosure 310 are coupled, shaking of the container 200 generated as the motor 105 and the processing member 240 rotate and/or shaking of the container 200 generated as the vacuum pump 106 operates may be suppressed.

Since the first lower end part 321, the second lower end part 322, and the third lower end part 323 forming the lower end of the upper enclosure 320 and the first upper end part 311, the second upper end part 312, and the third upper end part 313 forming the upper end of the lower enclosure 310 are formed of sealing members having an elastic force, noise may be effectively shielded.

According to an embodiment, at least one of the first lower end part 321, the second lower end part 322, and the third lower end part 323 forming the lower end of the upper enclosure 320 may include a magnetic material and a part in contact with the lower end part of the upper enclosure 320 including the magnetic material, among the first upper end part 311, the second upper end part 312, and the third upper end part 313 forming the upper end of the lower enclosure 310, may include a magnet to more firmly maintain coupling between the upper enclosure 320 and the lower enclosure 310 to more effectively shield noise.

Also, since the upper support surface 322a, the first side support surface 322b, and the second side support surface 322c of the upper enclosure 320 in contact with the handle support part 221 and the second upper end part 312 of the lower enclosure 310 are formed of sealing members having an elastic force, an impact generated between the handle support part 221 and the upper enclosure 320 or between the handle support part 221 and the lower enclosure 310 may be alleviated, while vibrations and shaking of the container 200 transmitted through the handle support part 221 are effectively suppressed.

FIG. 6 is a perspective view illustrating a state in which an upper enclosure is positioned in a released state, and FIG. 7 is a side view illustrating a state in which an upper enclosure is positioned in a released state.

As illustrated in FIGS. 6 and 7, the upper enclosure 320 is completely separated from the lower enclosure 310 in a released state. The upper enclosure 320 according to this embodiment is rotatably coupled to the support post 130, rather than being rotatably attached to the lower enclosure 310, the upper enclosure 320 may be completely separated from the lower enclosure 310 in the released state.

Also, since the upper enclosure 320 is rotatably coupled to the support post 130, a rotational radius is increased, compared with a case in which the upper enclosure 320 is rotatably coupled to the lower enclosure 310. Thus, in a process in which the upper enclosure 310 is switched from a coupled state to a released state or from the released state to the coupled state, a possibility of interference between the upper enclosure 320 and the container 200, specifically, the cover 230, is reduced. As a result, a degree of freedom regarding design of the shape of the cover 230 or the container 200 is enhanced, compared with the case in which the upper enclosure 320 is rotatably coupled to the lower enclosure 310.

Also, in order to allow the upper enclosure 320 to be smoothly switched from the coupled state to the released state or from the released state to the coupled state, the rotational axis A (see FIG. 2) of the upper enclosure may be positioned to be higher than a lower surface of the handle support part 221. Preferably, as illustrated in FIG. 7, the rotational axis A of the upper enclosure 320 may be substantially positioned to be adjacent to the first upper end part 311 of the lower enclosure 310.

Figure 8:
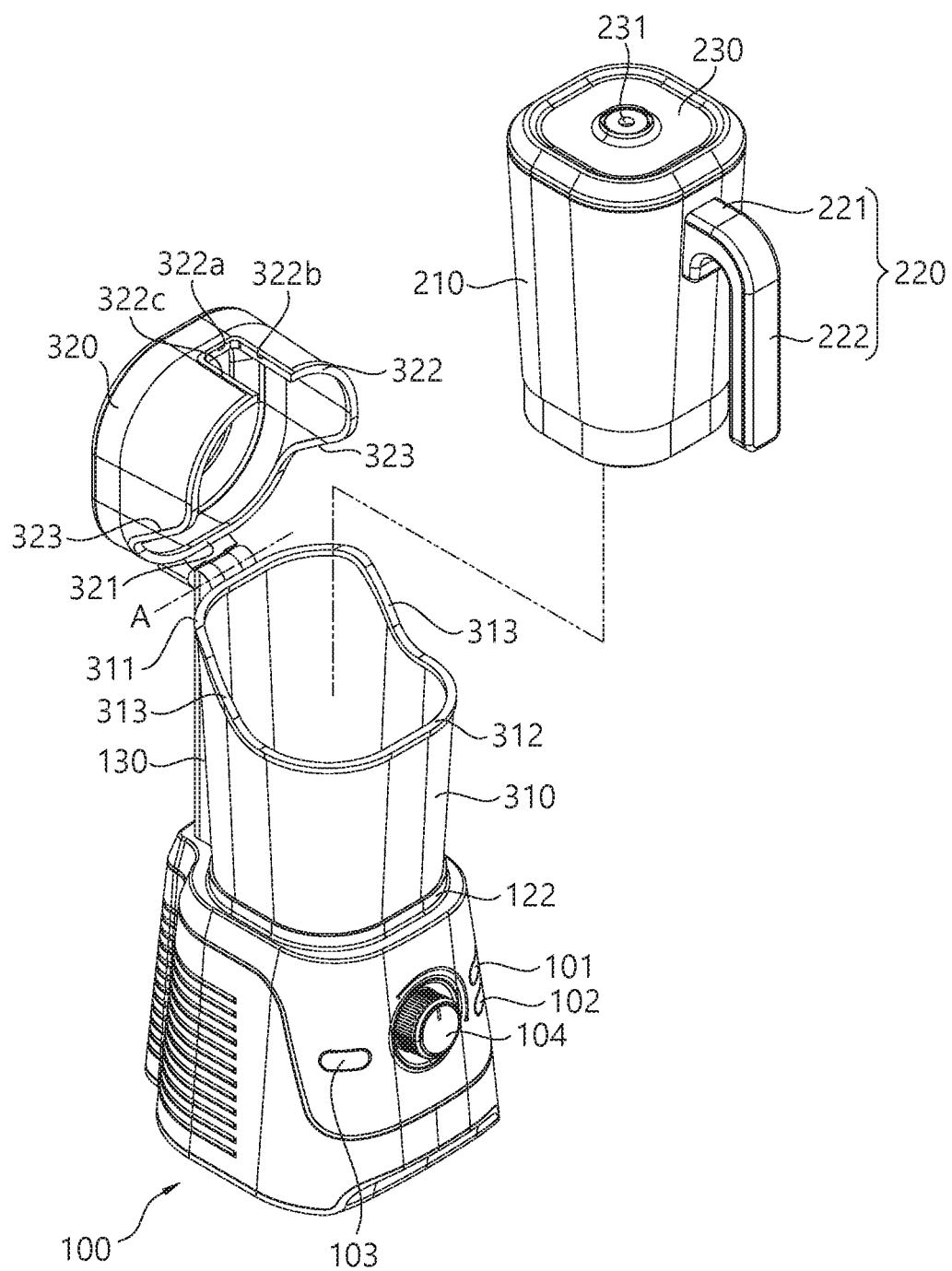
FIGS. 8 and 9 are views illustrating a method of using an enclosure of a food processor according to an embodiment of the present disclosure.
Figure 9:
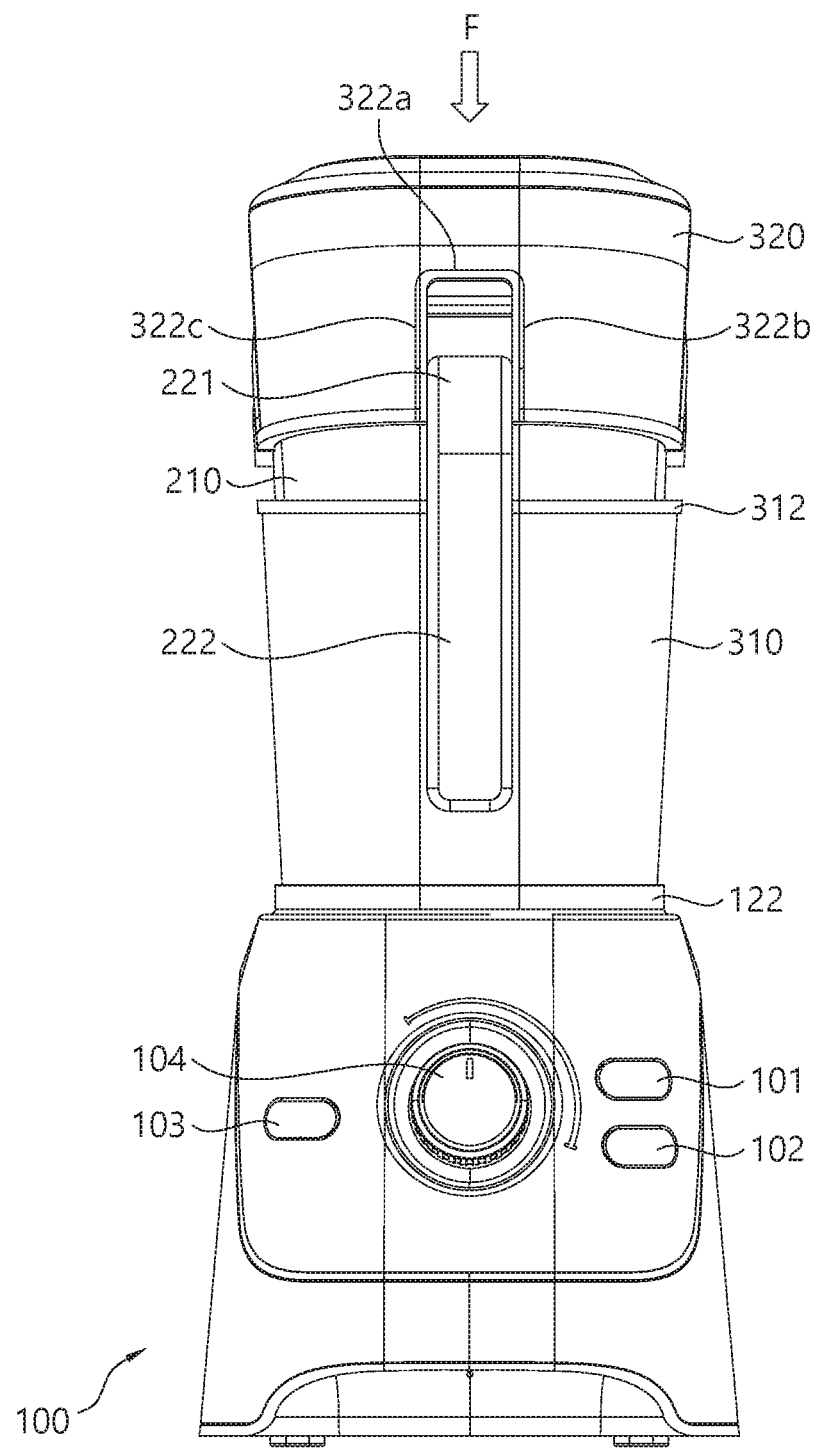

Hereinafter, a method of using the food processor 1 according to an embodiment of the present disclosure will be described. FIGS. 8 and 9 are views illustrating a method of using an enclosure of a food processor according to an embodiment of the present disclosure.

As illustrated in FIG. 8, in order to use the food processor 1, first, the lower enclosure 310 is mounted on the base 100. As described above, the lower enclosure 310 may be fixed to the base 100 by inserting the lower end of the lower enclosure 310 into a space between the inner support part 121 and the outer support part 122.

Next, in a state in which the upper enclosure 320 is positioned in the released state, the accommodation tub 210 is introduced through the opening present at an upper end of the lower enclosure 310 and the container coupling end 110 is inserted into a lower end of the accommodation tub 210 to fix the accommodation tub 210 to the base 100.

The container coupling end 110 may be configured to be asymmetrical forwards/backwards or leftwards/rightwards such that the accommodation tub 21 and the container coupling end 110 may not be coupled in any other state than the state illustrated in FIG. 6.

In a state in which the accommodation tub 210 is mounted on the base 100, a lower surface of the handle support part 221 is supported by an upper end (in particular, the second upper end part 312) of the lower enclosure 310.

Thereafter, food as a processing target is introduced to the inside of the accommodation tub 210 through the opening present at the upper end of the accommodation tub 210, and the cover 230 is subsequently coupled to the upper end of the accommodation tub 210.

Thereafter, the upper enclosure 320 is switched from the released state to the coupled state. That is, the user may rotate the upper enclosure 320 about the rotational axis A to lower the upper enclosure 320 toward the lower enclosure 310.

A space between the first side support surface 322b and the second side support surface 322c of the upper enclosure 320 is formed such that the upper surface of the handle support part 221 does not come into contact with the upper support surface 322a of the upper enclosure 320 merely by a self-load of the upper enclosure 320 unless the user applies separate external force thereto.

As illustrated in FIG. 9, a portion or the entirety of the handle support part 221 does not enter a space between the first side support surface 322b and the second side support surface 322c of the upper enclosure 320 merely by a self-load of the upper enclosure 320.

To this end, for example, tolerance of the space between the first side support surface 322b and the second side surface 322c and a length of the handle support part 221 in a width direction (a horizontal direction with respect to FIG. 9) may be transition fit tolerance. Or, in case where the first side support surface 322b and the second side support surface 322c are formed of a material having elastic force, the space between the first side support surface 322b and the second side support surface 322c may be formed to be slightly smaller than the length of the handle support part 221 in the width direction.

Thus, as illustrated in FIG. 9, in order for the upper surface of the handle support part 221 to be in contact with the upper support surface 322a of the upper enclosure 320 so as to be supported by the upper support surface 322a, the user should additionally apply an external force F to forcibly position the upper enclosure 320 to the coupled state.

This is to allow both the upper enclosure 320 and the lower enclosure 310 to more cooperatively stably support and fix the handle support part 221 in spite of vibrations generated during an operation of the food processor 1 and enhance hermetically closing force of the upper enclosure 320 and the lower enclosure 310 to more effectively shield noise in the coupled state.

After the upper enclosure 320 is positioned in the coupled state, the buttons 101, 102, 103, and the dial 104 provided in the base 100 are operated as necessary to process food.

For example, the buttons 101, 102, and 103 may include at least one of a blending button operating the motor 105 to perform an operation of rotating the processing member 240 and grinding a processing target, a vacuum button operating the vacuum pump 106 to perform an operation of exhausting the inside of the accommodation tub 210 to a negative pressure state, a vacuum/blending button performing an operation of rotating the processing member 240 and exhausting the inside of the accommodation tub 210 to a negative pressure state, and an automatic button performing an operation according to a preset control scheme.

As the upper enclosure 320 is positioned in the coupled state, the intake nozzle 327 exposed to a lower side of the upper enclosure 320 may maintain air-tightness with the intake port 231 of the cover 230.

In case where the inside of the accommodation tub 210 is required to be formed have negative pressure by operating the vacuum pump 106 during processing, the user may operate the vacuum operating unit 325 to face "LOCK" before operating the buttons 101, 102, and 103 and the dial 104, to maintain air-tightness between the intake nozzle 327 and the intake port 231, and fluidably connect the space connected to the inside of the accommodation tub 210, the intake port 231, the intake nozzle 327, the vacuum exhaust line 107, and the vacuum pump 106, and fluidably separate the space from any other space.

According to an embodiment, a sensor (not shown) sensing a state of the upper enclosure 320, that is, sensing whether the upper enclosure 320 is in the coupled state or the released state, may be provided, and the vacuum pump 106 and/or the motor 105 may be operated only when it is sensed by the sensor that the upper enclosure 320 is in the coupled state.

For example, the sensor may sense a state of the upper enclosure 320 by sensing contact between the lower end of the upper enclosure 320 and the upper end of the lower enclosure 310, contact between the upper enclosure 320 and the handle support part 221, or a rotation angle of the upper enclosure 320 with respect to the support post 130.

After processing the food is completed, when the vacuum operating unit 325 is positioned to face "LOCK", the user may operate the vacuum operating unit 325 to face "OPEN" to switch the negative pressure atmosphere between the intake nozzle 327 and the intake port 231 into an air pressure atmosphere and subsequently moves the upper enclosure 320 to the released state.

In a state in which the vacuum operating unit 325 is positioned to face "LOCK", the negative pressure atmosphere is formed between the intake nozzle 327 and the intake port 231 and it may be difficult to move the upper enclosure 320 to the released state due to a difference in pressure with the air pressure.

After the upper enclosure 320 is moved to the released state, the container 200 may be taken out through the opening of the upper end of the lower enclosure 310 and the lower enclosure 310 may be removed from the base 100 as necessary.

In the food processor 1 according to this embodiment, since the handle 222 is exposed to the outside of the enclosures 310 and 320, the upper enclosure 320 may be naturally moved from the coupled state to the released state only by a user motion of gripping the handle 222 and lifting the container 200, to take out the container 200.

Hereinafter, a food processor according to another embodiment will be described.

Figure 10:
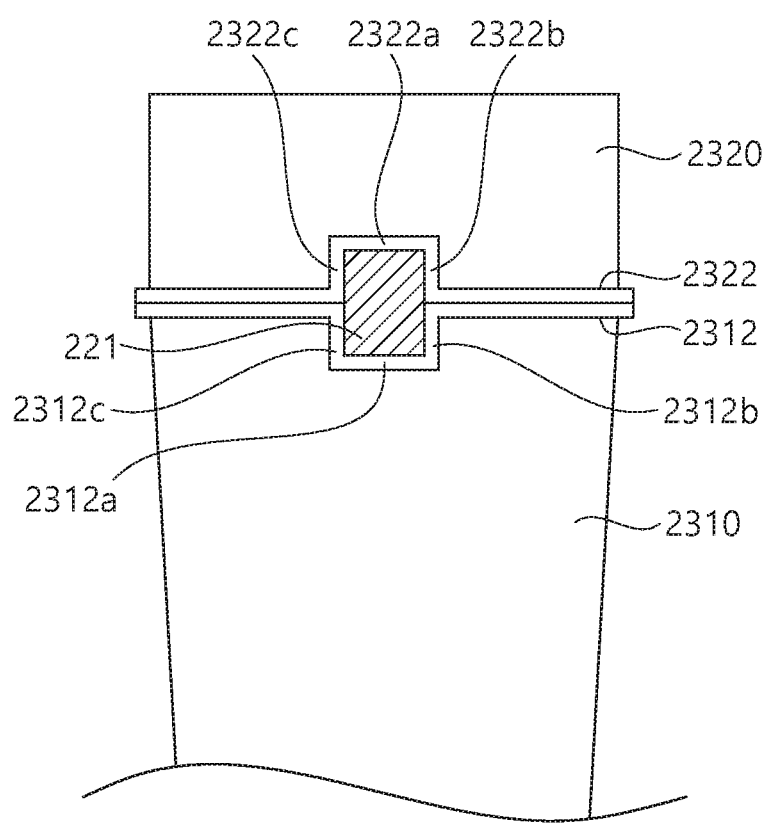
FIG. 10 is a view schematically illustrating a food processor according to another embodiment of the present disclosure.

FIG. 10 is a view schematically illustrating a food processor according to another embodiment of the present disclosure. For the purposes of description, descriptions of the same components as those described above in the aforementioned embodiment will be omitted.

As illustrated in FIG. 10, compared with the food processor 1 according to the embodiment described above, a food processor 2 according to the present embodiment includes an upper enclosure 2320 and a lower enclosure 2310 which are slightly different in shape from those of the upper enclosure and the lower enclosure of the previous embodiment.

An upper support surface 2322a, a first upper side support surface 2322b, and a second upper side support surface 2322c are provided at a second lower end part 2322 of the upper enclosure 2320. The upper support surface 2322a, the first upper side support surface 2322b, and the second upper side support surface 2322c form a circumference of a recess formed to be depressed toward an upper end from the second lower end part 2322.

In this embodiment, a lower support surface 2312a, a first lower side support surface 2312b, and a second lower side support surface 2312c are formed at a second upper end portion 2312 of the lower enclosure 2310.

As illustrated in FIG. 10, when the upper enclosure 2320 is positioned in the coupled state with respect to the lower enclosure 2310, an upper surface of the handle support part 221 is in contact with and supported by the lower support surface 2312a, one side surface of the handle support part 221 is in contact with and supported by the first upper side support surface 2322b and the first lower side support surface 2312b, and the other side surface of the handle support part 221 is in contact with and supported by the second upper side support surface 2322c and the second lower side support surface 2312c.

A space between the first lower side support surface 2312b and the second lower side support surface 2312c is formed such that the lower surface of the handle support part 221 is not in contact with the lower support surface 2312a of the lower enclosure 2310 merely by a self-load unless the user applies a separate external force thereto. That is, unless the user applies a separate external force, the entirety or a portion of the handle support part 221 does not enter a space between the first lower side support surface 2312b and the second lower side support surface 2312c of the lower enclosure 2310 only by the self-load of the container 200.

To this end, for example, tolerance of the space between the first lower side support surface 2312b and the second lower side surface 2312c and a length of the handle support part 221 in a width direction (a horizontal direction with respect to FIG. 10) may be transition fit tolerance. Or, in case where the first lower side support surface 2312b and the second lower side support surface 2312c are formed of a material having elastic force, the space between the first lower side support surface 2312b and the second lower side support surface 2312c may be formed to be slightly smaller than the length of the handle support part 221 in the width direction.

However, in order to prevent the lower enclosure 2310 from being removed from the base 100 together with the container 200 when the container 200 is removed from the base 100 through the upper end opening of the lower enclosure 2310, a force required for separating the handle support part 221 from the lower enclosure 2310 may be designed to be smaller than a force required for separating the lower enclosure 2310 from the lower enclosure coupling ends 121 and 122.

In the food processor 2 according to this embodiment, since the side surface of the handle support part 221 is supported by the upper enclosure 2320 and the lower enclosure 2310, the enclosures 2310 and 2320 may firmly suppress shaking of the container 200, compared with the aforementioned food processor 1.

Figure 11:
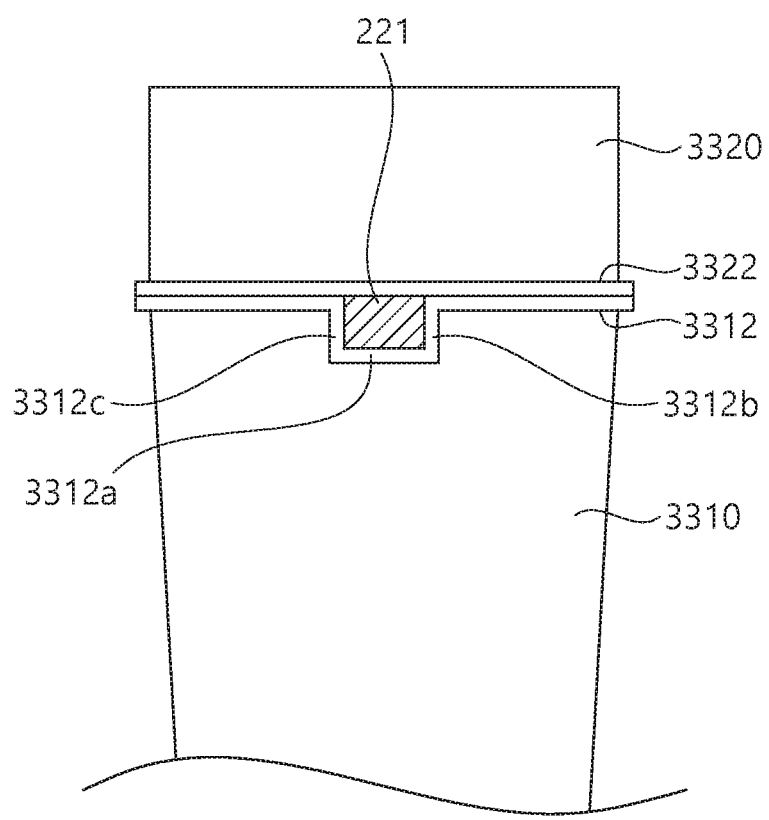
FIG. 11 is a view schematically illustrating a food processor according to another embodiment of the present disclosure.

FIG. 11 is a view schematically illustrating a food processor according to another embodiment of the present disclosure. For the purposes of description, descriptions of the same components as those described above in the aforementioned embodiment will be omitted.

As illustrated in FIG. 11, compared with the food processor 1 according to the embodiment described above, a food processor 3 according to the present embodiment includes an upper enclosure 3320 and a lower enclosure 3310 which are slightly different in shape from those of the upper enclosure and the lower enclosure of the previous embodiment.

That is, in the food processor 3 according to the present embodiment, the upper support surface 322*a*, the first side support surface 322*b*, and the second side support surface 322*c* are not formed at a second lower end part 3322 of the upper enclosure 3320, and a lower support surface 3312*a*, a first side support surface 3312*b* and a second side support surface 3312*c* are formed at a second upper end part 3312 of the lower enclosure 3310.

As illustrated in FIG. 11, when the upper enclosure 3320 is positioned in the coupled state with respect to the lower enclosure 3310, an upper surface of the handle support part 221 is in contact with and supported by the second lower end part 3322 of the upper enclosure 3320, a lower surface of the handle support part 221 is in contact with and supported by the second lower end part 3322 of the upper enclosure 3320, a lower surface of the handle support part 221 is in contact with and supported by the lower support surface 3312*a*, one side surface of the handle support part 221 is in contact with and supported by the first side support surface 3312*a*, and the other side surface of the handle support part 221 is in contact with and supported by the second lower support surface 3312*c*.

A space between the first side support surface 3312*b* and the second side support surface 3312*c* is formed such that the lower surface of the handle support part 221 is not in contact with the lower support surface 3312*a* of the lower enclosure 3310 merely by a self-load unless the user applies a separate external force thereto. That is, unless the user applies a separate external force, the entirety or a portion of the handle support part 221 does not enter a space between the first side support surface 3312*b* and the second side support surface 3312*c* of the lower enclosure 3310 merely by the self-load of the container 200.

To this end, for example, tolerance of the space between the first side support surface 3312*b* and the second side surface 3312*c* and a length of the handle support part 221 in a width direction (a horizontal direction with respect to FIG. 11) may be transition fit tolerance. Or, in case where the first side support surface 3312*b* and the second side support surface 3312*c* are formed of a material having elastic force, the space between the first side support surface 3312*b* and the second side support surface 3312*c* may be formed to be slightly smaller than the length of the handle support part 221 in the width direction.

However, in order to prevent the lower enclosure 3310 from being removed from the base 100 together with the container 200 when the container 200 is removed from the base 100 through the upper end opening of the lower enclosure 3310, a force required for separating the handle support part 221 from the lower enclosure 3310 may be designed to be smaller than a force required for separating the lower enclosure 3310 from the lower enclosure coupling ends 121 and 122.

In the food processor 3 according to this embodiment, since the upper support surface 322*a*, the first side support surface 322*b*, and the second side support surface 322*c* are not formed at the second lower end part 3322 of the upper enclosure 3320, a distance from the upper end of the upper enclosure 3320 to the second lower end part 3322 may be short, relative to the food processor 1 according to the embodiment described above.

As a result, when the upper enclosure 3320 is switched from the coupled state to the released state or from the released state to the coupled state, a possibility of interference with the container 200, specifically, the cover 230, is significantly reduced, reducing limitations in design due to interference between the cover 230 and the upper enclosure 3320.

Features and aspects of the various embodiments described above can be combined to provide further embodiments. These and other changes can be made to the embodiments in light of the above-detailed description.

While the exemplary embodiments have been shown and described, it will be understood by those skilled in the art that various changes in form and details may be made thereto without departing from the spirit and scope of the present disclosure as defined by the appended claims. Therefore, it should be understood that the embodiments described above are just exemplary and not limiting in all aspects. The scope of the present disclosure is defined in the appended claims, and all changes and modifications derived from the claims and their equivalents should be interpreted as being included in the scope of the present disclosure.

The invention claimed is:

1. A food processor comprising:
a base including a lower enclosure coupling end;
a container including an accommodation tub installed on an upper surface of the base to accommodate a processing target, a handle support part laterally protruding from a side surface of the accommodation tub, and a handle extending from the handle support part;
a lower enclosure detachably installed at the lower enclosure coupling end of the base to surround a lower portion of the accommodation tub and supporting a lower surface of the handle support part by a portion of an upper end thereof; and
an upper enclosure positionable in a coupled state or a released state with respect to the lower enclosure, and being engaged with the lower enclosure in the coupled state such that a portion of a lower end thereof supports an upper surface of the handle support part,
wherein at least one of the upper enclosure and the lower enclosure supports a side surface of the handle support part to suppress shaking of the container.

2. The food processor of claim 1, wherein
the lower end of the upper enclosure includes an upper support surface and a first side support surface and a second side support surface, respectively, extending downwards from both ends of the upper support surface, and
in the coupled state, the upper support surface supports the upper surface of the handle support part, and the first side support surface and the second side support surface support at least a portion of a side surface of the handle support part.

3. The food processor of claim 2, wherein a space between the first side support surface and the second side support surface is formed such that, when the upper enclosure is moved from the released state to the coupled state, the handle support part cannot enter the space between the first side support surface and the second side support surface merely by a self-load of the upper enclosure, or, if the handle support part can enter the space between the first side support surface and the second side support surface, the handle support part cannot come into contact with the upper support surface, and an upper surface of the handle support part can come into contact with the upper support surface only by an additional external force.

4. The food processor of claim 2, wherein the upper support surface, the first side support surface, and the second side support surface are configured as sealing members having an elastic force.

5. The food processor of claim 1, wherein
the upper end of the lower enclosure includes a lower support surface and a first side support surface and a second side support surface, respectively, extending upwards from both ends of the lower support surface, and
in the coupled state and the released state, the lower support surface supports the lower surface of the handle support part and the first side support surface and the second side support surface support at least a portion of the side surface of the handle support part.

6. The food processor of claim 5, wherein a space between the first side support surface and the second side support surface is formed such that, when the container is installed on the upper surface of the base, the handle support part cannot enter the space between the first side support surface and the second side support surface merely by a self-load of the container, or, if the handle support part can enter the space between the first side support surface and the second side support surface, the handle support part cannot come into contact with the lower support surface, and a lower surface of the handle support part can come into contact with the lower support surface only by an additional external force.

7. The food processor of claim 5, wherein the lower support surface, the first side support surface, and the second side support surface are configured as sealing members having an elastic force.

8. The food processor of claim 1, wherein
the container further includes a processing member rotatably installed within the accommodation tub to process the processing target,
the base includes a power source providing a rotational power to the processing member, and
in the coupled state, the upper enclosure and the lower enclosure support the upper surface, the lower surface, and the side surface of the handle support part to suppress shaking of the container caused due to rotation of the processing member.

9. The food processor of claim 1, further comprising:
a vacuum exhaust line fluidably connected to the inside of the accommodation tub accommodating the processing target in the coupled state; and
a vacuum pump connected to the vacuum exhaust line and exhausting internal air of the accommodation tub to the outside through the vacuum exhaust line,
wherein, in the coupled state, the upper enclosure and the lower enclosure support the upper surface, the lower surface, and the side surface of the handle support part to suppress shaking of the container caused during an operation of the vacuum pump.

10. The food processor of claim 1, wherein the upper enclosure is engaged with the lower enclosure, while surrounding an upper portion of the accommodation tub, in the coupled state, to form an air-tight space surrounding the accommodation tub and at least a portion of the handle support part.

11. The food processor of claim 10, wherein in the coupled state, the lower end of the upper enclosure and the upper end of the lower enclosure are engaged with each other, excluding a portion in contact with the handle support part.

12. The food processor of claim 11, wherein the lower end of the upper enclosure and the upper end of the lower enclosure are configured as sealing members having an elastic force.

13. The food processor of claim 10, wherein
the upper enclosure is installed to be rotatable within a range of a predetermined angle with respect to the lower enclosure so as to be positioned in the released state and the coupled state, and
a rotation center of the upper enclosure is positioned to be higher than the lower surface of the handle support part.

14. The food processor of claim 13, wherein
the lower end of the upper enclosure includes a first lower end part positioned to be adjacent to the rotation center, a second lower end part supporting the handle support part, and a third lower end part connecting the first lower end part and the second lower end part,
both ends of the second lower end part are positioned to be lower than the first lower end part, and
the third lower end part connects the first lower end part and the second lower end part, while forming an oblique line.

15. The food processor of claim 14, wherein the second lower end part includes an upper support surface supporting an upper end of the handle support part, wherein a first side support surface and a second side support surface, respectively, extend downwards from both ends of the upper support surface and support at least a portion of the side surface of the handle support part.

16. The food processor of claim 13, wherein
the upper end of the lower enclosure includes a first upper end part positioned to be adjacent to the rotation center, a second upper end part supporting the handle support part, and a third upper end part connecting the first upper end part and the second upper end part,
both ends of the second upper end part are positioned to be lower than the first upper end part, and
the third upper end part connects the first upper end part and the second upper end part, while forming an oblique line.

17. The food processor of claim 13, further comprising:
a support post extending upwards from the base and rotatably supporting the upper enclosure.

18. The food processor of claim 17, further comprising:
a vacuum pump provided within the base; and
a vacuum exhaust line connected to the vacuum pump at one end and connected to the upper enclosure at the other end through the support post and fluidly connected to the inside of the accommodation tub in the coupled state.

19. The food processor of claim 1, wherein the upper enclosure is completely separated from the lower enclosure in the released state.

20. A food processor comprising:
a base including a lower enclosure coupling end;
a container including an accommodation tub installed on an upper surface of the base and accommodating a processing target, a handle support part laterally protruding from a side surface of the accommodation tub, and a handle extending upwards or downwards from the handle support part;

a lower enclosure detachably installed at the lower enclosure coupling end to surround a lower portion of the accommodation tub; and an upper enclosure positioned in a coupled state and a released state with respect to the lower enclosure and which cooperatively supports the handle support part together with the lower enclosure to suppress shaking of the container.

* * * * *